United States Patent

[11] 3,567,064

[72] Inventor Roy G. Churan
  Oak Lawn, Ill.
[21] Appl. No. 861,512
[22] Filed Sept. 26, 1969
[45] Patented Mar. 2, 1971
[73] Assignee Bennett Industries, Inc.
  Peotone, Ill.
  Continuation of application Ser. No.
  742,773, July 5, 1968, now abandoned.

[54] PLASTIC CONTAINER HAVING A MULTIPLE CLOSURE
  2 Claims, 6 Drawing Figs.
[52] U.S. Cl. .................................................. 220/29
[51] Int. Cl. ............................................... B65d 41/02
[50] Field of Search .......................................... 220/29, 46, 68, 66, 72, 83

[56] References Cited
UNITED STATES PATENTS
3,184,524  5/1965  Whiteford ........... 220/(Plastics Digest)
3,425,471  2/1969  Yates, Jr. ...................... 220/29-X Primary Examiner—Ralphael H. Schwartz
Attorneys—Roland L. Engel, Daniel W. Vittum, Jr. and Gomer W. Walters ABSTRACT: An improved closure arrangement for a molded plastic open head container for use in the shipment and/or storage of hot filled items includes an open head cylindrical plastic container body, a first, relatively thin, resilient, plastic diaphragm closure including an inverted channel provided at the periphery thereof, with the inverted channel being adapted for positioning downwardly over the periphery of the open end of the container body, and an outer closure fabricated of a material substantially more rigid than the plastic material of the diaphragm closure and including inverted channel means provided at the periphery thereof and adapted for positioning downwardly over the container body and diaphragm closure means in order to close the open end of the container body. At least one pressure release opening is provided in the outer closure, and the diaphragm inner closure means is susceptible of flexing in response to pressure differentials created within the closed container such that internal pressure changes are normalized by flexure of the diaphragm closure means, with the substantially rigid outer closure member being retained in its normal strength imparting position.

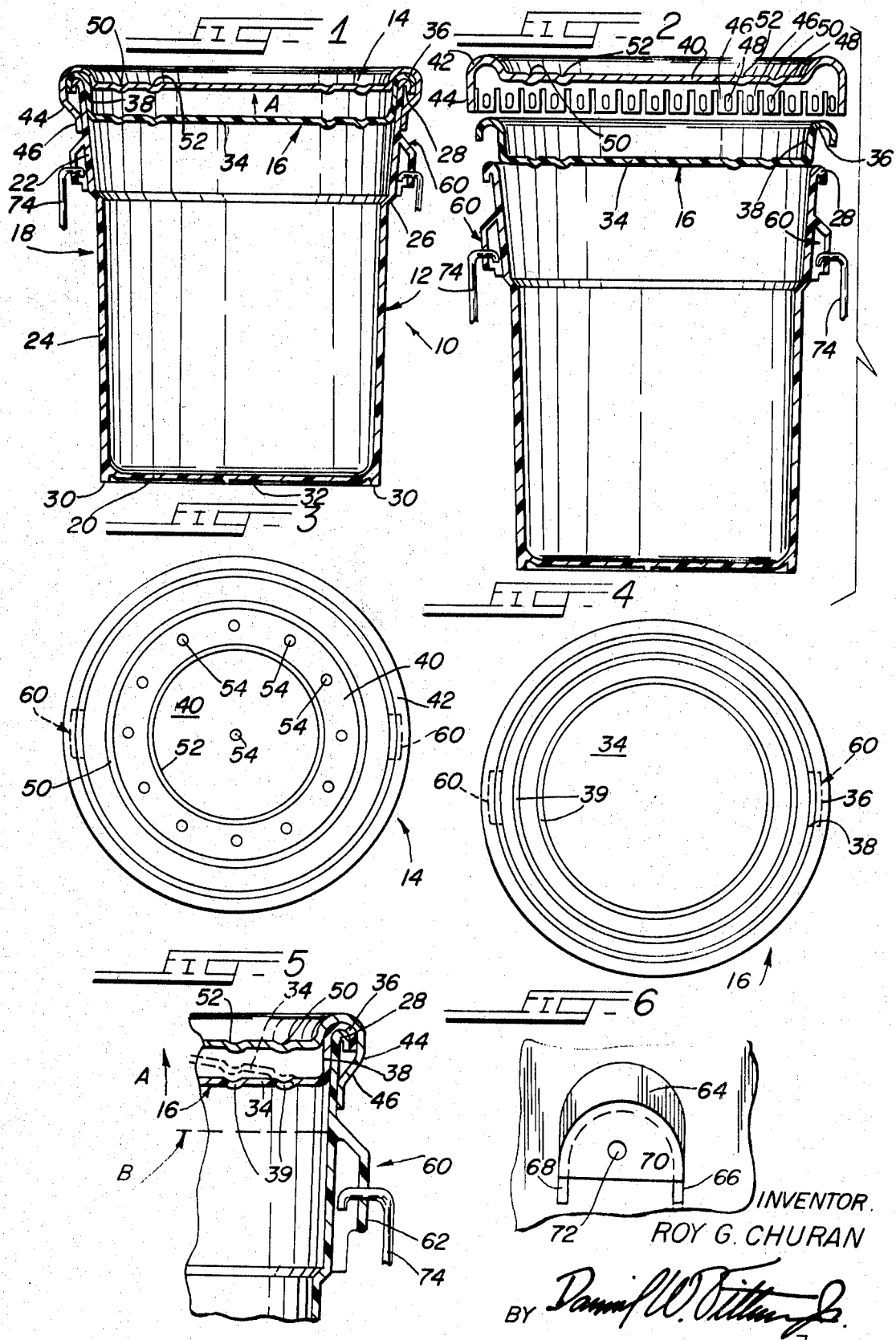

PLASTIC CONTAINER HAVING A MULTIPLE CLOSURE

This application is a continuation of U.S. Ser. No. 742,773, filed Jul. 5, 1968, and now abandoned.

BACKGROUND OF THE INVENTION

1. Field of the Invention

This invention generally relates to plastic container sealing arrangements, and more particularly is concerned with a closure arrangement for plastic drums, pails, and other similar containers that are especially adapted to be filled with heated materials (such as foodstuffs, chemicals, or the like) and sealed immediately thereafter.

2. Description of the Prior Art

The prior art contains numerous examples of attempts to design closure arrangements adapted for use with plastic drums and pails. This proliferation of design in the field of plastic containers has, in large measure, resulted from the obvious advantages of plastic over conventional materials such as steel. A plastic container suitable for shipping and storage would be more economical than a similarly sized metal container by reason of the comparatively higher cost of conventionally utilized materials in relation to plastics (such as polyethylene). Moreover, problems of corrosion, which often arise with metal containers, could be avoided since plastics are generally more resistant than metals to corrosion and other similar forms of attack. Additionally, the effective substitution of plastic for metal in a commercial shipping container results in significant economies with respect too the weight of the container. However, despite these advantages, full utilization of plastic for commercial shipping and storage containers has not been realized because of difficulties involved in providing acceptable sealing arrangements for use with a plastic container body.

One problem has been encountered in the case of plastic containers designed for use in shipping and/or storing foodstuffs and other similar products which are introduced into the container in a heated condition, with the container being immediately closed while the contents are still hot for reasons of convenience, sanitation, or the like. Where plastic container bodies are utilized for such containers, problems have been experienced due to the action of the heated contents increasing the pressure within the container as cooler air trapped between the contents of the container and the closure is heated by the contents of the container. More particularly, when such heating and pressure increase is experienced, container arrangements of the prior art have experienced an outward swelling of the plastic container which is relatively weaker than the conventional metallic closures used with such containers. Likewise, the normally flat plastic bottoms of such containers have on occasion bowed outwardly thereby diminishing the stability of the container and, as a practical matter, preventing the stacking thereof.

Similar problems are encountered when a cold filled plastic container is closed and then heated so as to warm the contents, an action which causes the same increase in temperature and pressure within the closed volume of the container.

Accordingly, a primary object of the present invention is to provide a closure arrangement for a plastic container body which can be utilized with hot filled contents without the objectionable side effects that have been experienced with the prior art.

A related object is to provide an arrangement of the character described which utilizes conventional filling and closure machinery for the containers of the present invention.

Yet another object is to provide an arrangement of the character described utilizing an inner flexible diaphragm seal to absorb pressure increases within the closed container.

SUMMARY OF THE INVENTION

In accordance with the present invention, an improved closure arrangement for a molded plastic open head container intended for use in shipment and/or storage of hot filled contents includes, in combination with an open end container body having a sidewall structure and a bottom wall structure formed integrally therewith at one end thereof, with the other end of the container body being open, a relatively thin, flexible, plastic inner diaphragm closure having an inverted channel provided at the periphery thereof. The diaphragm closure, which has a generally disclike center section capable of flexing in response to pressure changes within the sealed container, is adapted for positioning downwardly over the periphery of the open end of the container body with the inverted channel member sealingly engaging the sidewall structure thereof and with the disclike center section extending downwardly into the container body. An outer closure, fabricated of a material substantially more rigid than the plastic material of the container body, includes an inverted channel provided at the periphery thereof and a generally disclike center section. The outer closure is adapted for positioning downwardly over the container body and diaphragm closure means with the inverted channel fitting downwardly over the inverted channel on the diaphragm closure and with the disclike center section of the outer closure being spaced apart from the disclike center section in order to close the open end of the container body. Means are provided for effecting an interlock between the outer closure means and the container body, and at least one pressure release opening is provided in the outer closure, whereby changes in pressures within the sealed container are normalized by flexure of the diaphragm closure, with the outer closure and the container body retaining their normal configurations.

DESCRIPTION OF THE DRAWING

The foregoing and other objects, advantages, and features of the subject invention will hereinafter appear, and, for purposes of illustration, but not of limitation, exemplary embodiments of the present invention are illustrated in the accompanying drawing, in which:

FIG. 1 is a cross-sectional, side-elevational view of a container and closure arrangement produced in accordance with the present invention;

FIG. 2 is an exploded view thereof;

FIG. 3 is a top plan view of the arrangement shown in FIG. 1;

FIG. 4 is a plan view of the arrangement thereof with the outer closure removed;

FIG. 5 is an enlarged cross-sectional view showing the assembled container and closure arrangement and also the manner in which handle means are attached to the container; and FIG. 6 is a fragmentary side-elevational view showing one feature of the container.

DESCRIPTION OF THE PREFERRED EMBODIMENT

With reference to the drawing, a composite container 10, comprising an open head container body 12, and outer closure 14, and an inner diaphragm closure 16, is illustrated. Container body 12 comprises a generally cylindrical sidewall structure 18 and an integrally formed bottom wall structure 20. Sidewall structure 18 has a larger diameter upper portion 22 and a somewhat smaller diameter portion 24 therebelow, with an angular inclined band member 26 integrally formed between portions 22 and 24. The presence of band 26 enhances the strength of the container body 12. An inverted U-shaped rim 28 is provided at the top edge of the container body 12. As shown in the drawing, the sidewall structure 18, including both upper and lower portions 22, 24 thereof, may advantageously be tapered inwardly toward the bottom to facilitate the stacking thereof in a nested fashion.

As shown in FIGS. 1 and 2, bottom wall structure 20 is offset upwardly slightly, so that an annular rim 30 formed by the lower edge of generally cylindrical sidewall portion 24 provides the surface on which the container body rests. A similar annular rim 32 is provided centrally of the bottom wall structure 20 and likewise provides a bearing surface on which the container rests.

A pair of handle-mounting means are provided at diametrically opposed points on container body 12. As best shown in FIGS. 5 and 6, handle mounting means 60 comprises an open bottomed enclosure 62 which is preferably integrally molded with container body 12. Enclosure 62 has in inclined curved upper surface 64, a pair of sidewalls 66, 68, and an outer wall 70, with an opening 72 therethrough. The end of a conventional wire bail 74 (not shown in FIG. 6) is pivotally mounted through opening 72. Thus, bail 74 is easily pivotable from a rest position to a raised carrying position.

Diaphragm closure 16 comprises a generally flat center disc 34, an annular outer U-Shaped rim 36, adapted to fit downwardly over rim 28 on the container body. Rim 28 is connected with center portion 34 by means of an annular inclined band 38 which extends downwardly into the interior of the container body such that a space is provided between closure 14 and the center disc 34 for a purpose that will hereinafter appear. A pair of annular grooves 39 may be advantageously molded in disc section 34 in order to increase the strength of diaphragm closure 16. As best shown in FIG. 5, rim 36 and band 38 are so configured as to sealingly fit over the open end of container body 12. Diaphragm closure 16 is relatively thin (i.e., of the order of magnitude of about 0.0125 inch thick) and is capable of flexing for a purpose that will hereinafter appear.

The container body 12 and diaphragm closure 16 produced in accordance with the present invention are preferably formed from a suitable, semirigid plastic. An especially preferred plastic is polyethylene having a density ranging between 0.941 and 0.965 grams per cubic centimeter (ASTM test D-1505-63T) and a melt index ranging between 0.1 and 25.0 (ASTM test D-1238-62T). Where the latter preferred polyethylene is employed in producing a blow-molded container or diaphragm closure, the melt index preferably ranges between 0.1 and 0.5, whereas when it is employed in producing an injection molded container or diaphragm closure, the melt index preferably lies between 4.0 and 25.0. Of course, as will be obvious to those skilled in the art, the container body and diaphragm closure may be constructed or fabricated from various other suitable materials and by a variety of manufacturing processes such as injection molding.

Closure 14 comprises a generally flat center disc 40 and an inverted peripheral bead 42 provided at the periphery thereof. A skirt 44 depends from the outer portion of bead 42 and terminates in a plurality of spaced lugs 46. Each lug 46 is provided with a slot 48 which is adapted to receive a tool to be utilized in removing the closure from the container in a manner that will hereinafter be described. A pair of annular grooves 50, 52 are formed in the center disc 40 of the closure in order to impart strength thereto.

A plurality of openings 54 are provided in center portion 40 of closure 14 in order to permit air or other gas to pass therethrough as will hereinafter be described in detail. The exact number of openings and the order of placement thereof is not critical. It is only necessary that a sufficient number of openings be provided in order to permit the first passage of air or other gas therethrough.

Closure 14 is fabricated of a material substantially more rigid than the plastic from which container body 12 is fabricated. Among such materials are metals, such as steel and the like, and, in addition, the closure may be molded, preferably by conventional injection-molding techniques, from fiber impregnated plastic. A suitable fiber impregnated plastic-supporting collar comprises approximately 70 percent high density polyethylene and about 30 percent asbestos fiber. Asbestos fiber of the thixotropic flow-type, for example, anthophyllite asbestos, is preferably employed. Of course, as will be obvious to one skilled in the art, various other plastics and fibers, as well as other percentage compositions may be employed, so long as the closure is substantially more rigid than the plastic material of the container body 12.

The closure arrangement of the present invention is utilized in the following manner. Container body 12 is first filled with the heated contents to a level approximately the dotted line level denoted by the reference character B in FIG. 5. Diaphragm closure 16 is next positioned over the open mouth of the container, with the rim 36 and inclined band 38 contacting rim 28 and upper sidewall portion 22. Outer closure 14 is then placed downwardly over the container body and diaphragm closure, and lugs 44 are crimped inwardly to the position shown in FIGS. 1 and 5, thereby locking the closure in position and sealing the contents of the container.

At this point, due to the heated condition of the contents of the container, the temperature of the air in the space between center disc 34 of diaphragm closure 16 and level B increases and pressure instantaneously builds up within the closed container. However, rather than the increased pressure being absorbed by an outward bowing of the sidewall or bottom wall structures of the container body, the center disc 34 of diaphragm closure 16 flexes upwardly in the direction shown by the arrow A in FIG. 5 so as to equalize pressure within the container with the ambient pressure (the position for center disc 34 after such flexure being shown in broken lines in FIG. 5). However, because of the plurality of openings 54 provided in the center disc of outer closure 14, pressure is not built up in the space between diaphragm closure 16 and outer closure 14, and hence outer closure 14 and container body 12 retain their respective normal configurations.

Thus, in accordance with the present invention a simple, easily used arrangement has been provided for equalizing the pressure within a closed container with ambient pressure without structurally modifying the container body or the outer closure thereof. Even if the container is not ordinarily filled with heated material, if after filling and sealing the container is thereafter subjected to heating, any pressure that builds up within the space between level B and diaphragm closure 16 will immediately be equalized with the ambient pressure by flexure of the diaphragm closure. Likewise, if the pressure between the diaphragm closure and level B for any reason diminishes after sealing, the diaphragm closure will flex in the opposite direction to normalize the pressure within the container to ambient conditions. Of course, as will be obvious to those skilled in the art, pressure release means other than openings 54 in closure 14 may, if desired, be employed. In all events, however, the present invention provides an arrangement in which the sidewall structure of container body 12 retains its original generally cylindrical configuration, and the closure 14, formed of a material substantially more rigid than the plastic of the container body, retains its configuration and contributes strength to the open end of the molded plastic container body.

I claim:
1. A sealable container comprising:
   an open end plastic container body having an inwardly tapered sidewall structure and a bottom wall structure formed integrally therewith at one end thereof, with the other end of the container body being open;
   a relatively thin, flexible, plastic inner diaphragm closure including a generally disclike center section and an inverted channel provided at the periphery thereof, with the inverted channel being separated from the disclike center section by an inclined band of substantial width, the said band being tapered to substantially the same degree as the container body sidewall structure;
   with the diaphragm closure being adapted for positioning downwardly over the periphery of the open end of the container body with the disclike center section extending downwardly into the container body,
   with the inverted channel being adapted for sealing engagement with the sidewall structure of the container body adjacent the open end thereof,
   with the inclined band being adapted to tightly contact the sidewall structure of the container body, and with the diaphragm closure being susceptible to flexure in response to pressure changes within the sealed container, an outer closure fabricated of a material substantially more rigid than the plastic material of the container body and including a generally disclike center section and an inverted channel provided at the periphery thereof;

with the said outer closure being adapted for positioning downwardly over the container body and diaphragm closure in order to close the open end of the container body, and with the disclike center section of the outer closure being spaced apart a substantial distance from the disclike center section of the diaphragm closure so as to permit substantial flexure of diaphragm closure in an axial direction toward the outer closure without coming into contact therewith, pressure release means for the outer closure, and means for effecting an interlock between the outer closure and the container body, whereby changes in pressure within the sealed container are absorbed by flexure of the diaphragm closure, with the outer closure and the container body retaining their respective normal configurations.

2. A sealable container, as claimed in claim 1, wherein the pressure release means comprises at least one opening in the disclike center section of the outer closure.